United States Patent Office 2,727,574
Patented Dec. 20, 1955

2,727,574

ACID TREATING SILICEOUS FORMATIONS

Donald C. Bond, Crystal Lake, Ill., assignor to The Pure Oil Company, Chicago, Ill., a corporation of Ohio No Drawing. Application April 29, 1952,
Serial No. 285,051

7 Claims. (Cl. 166—38)

This invention relates to the acid treatment of geological formations. It is more specifically directed to improvements in the acid treating of siliceous geological formations with fluophosphoric acids.

The increased utilization of petroleum products has resulted in the need for an increase in the amount of crude oil produced. This increase in the production requirements must be met by the completion of new producing wells and increase in the production rates of old wells. Various techniques including acidization are available for effecting these results. However acidization procedures have been restricted generally to application in limestone and dolomite formations using hydrochloric acid as the acidizing medium. Reagents such as hydrofluoric acid and its derivatives described in the prior art as media for acidizing siliceous formations have had shortcomings which have made their use inadvisable. Recent significant developments in this phase of acidizing however have provided a reagent which will react with siliceous formations to increase their permeability without the attendant difficulties experienced in using the chemical reagents previously used. In United States patent application Serial Number 109,411 filed August 9, 1949, and United States patent application Serial Number 178,958 filed August 11, 1950, there is described the use of fluophosphoric acids in the acid treating of siliceous formations for increasing the productivity of wells. It has now been found that the efficacy of these methods may be enhanced by employing a manipulative procedure not heretofore used in conventional acidizing techniques.

It is therefore an object of this invention to treat siliceous geological formations with fluophosphoric acids to obtain improved results. This and other objects and advantages will be evident from the following discussion of the subject invention.

It has been found that the effectiveness of acidizing with fluophosphoric acids may be enhanced by contacting the siliceous formation with the acidizing agent which has been heated to an elevated temperature. According to the instant invention this may be effected by allowing the fluophosphoric acid-containing treating solution to react partially with loose sand in the well bore adjacent to the formation to be treated. This causes the unreacted acid to be heated because of the heat involved in the reaction between the fluophosphoric acid and the loose sand. As a result, the fluophosphoric acid-containing treating solution may be then forced through the walls of the borehole and into the formation interstices at an elevated temperature. This expedient will result in an increase in the rate of reaction of the acid on the siliceous constituents of the formation. To illustrate the effect of temperature on the rate of solution of silica, several mixtures containing 65 cc. of 50 per cent difluophosphoric acid solution and 10 gm. of 40 mesh sand were agitated for 10 minutes at various temperatures. The effect of temperature on the rate of reaction is shown in Table I.

TABLE I

| Temperature, °F.: | Percent sand dissolved |
|---|---|
| 80 | 1.5 |
| 100 | 2.8 |
| 120 | 4.9 |
| 140 | 7.5 |
| 160 | 11.2 |

The above table thus illustrates the advantageous effects that are obtained in employing the instant invention to facilitate the acid treatment of siliceous formations with fluophosphoric acid-containing media. It is thus seen that the reactivity increases as the temperature increases, the reactivity doubling with about every 25° F. increase in temperature. In taking advantage of the large amount of heat which is given off in the reaction between aqueous fluophosphoric acid and sand, loose siliceous sand obtained from a suitable source may be placed adjacent to the formation which is being acidized with fluophosphoric acid-containing treating solution. In the alternative the sandstone formation in the well may be shot with a light explosive charge of the different types of explosives normally used in well shooting. In using this method it is only necessary that a small amount of detrital particles of siliceous reservoir rock be produced in the well. Therefore the amount of the explosive charge employed should be regulated to produce within the borehole only the desired amount of siliceous particles. It also may be desirable to ream the face of the formation to be treated with a suitable bit to give the desired amount of loose sand in the hole. For example, an expansion wall scraper or a roller cutter underreamer is a suitable tool for this purpose. Fluophosphoric acid will then be introduced into the borehole and agitated in contact with the loose sand. Contact between sand and acid can be provided by reciprocating a swab or bailer in the hole to agitate the admixture. Horizontal jets at the bottom of the tubing will also facilitate mixing of the sand and the acid. After the mixture has been allowed to react for a period of from about 5 to 60 minutes to produce a partially spent fluophosphoric acid-containing solution, the temperature of the solution will rise to about 200° F. As a result of the rise in temperature because of the heat of reaction of the sand and the fluophosphoric acid within the well bore, the reactivity of the fluophosphoric acid will be greatly increased. By applying pressure by suitable means to the resultant solution the hot, partially spent fluophosphoric acid solution will be forced into the sandstone formation and dissolve the exposed siliceous surfaces and thereby increase the permeability of the siliceous formation with greater effectiveness than conventional methods of acidizing. Because of the need for agitation and the need for equipment within the well bore to effectuate the agitation of the sand and the fluophosphoric acid treating solution to obtain intimate contacting, it may be preferred to employ a water slurry of finely divided silica sand as a means for introducing sand into the borehole. When carrying out this method the aqueous slurry of sand and anhydrous acid are separately introduced into the well and allowed to mix at the face of the producing area which is to be treated. The proportions of sand and acid employed are not critical. It is only necessary to control the reaction to prevent the acid constituent from becoming totally spent and therefore ineffectual as an acidizing medium. Accordingly it is preferred that the proportions of sand and acid employed be regulated so that only about 10 per cent to 30 per cent of the acid will be spent before being introduced into the sandstone formation. Operation within this desirable range can be achieved by using about 0.12 to 0.36 pound of silica per gallon of 50 per cent difluophosphoric acid. Suitable adjustments in the amounts of sand used will, of course, be made when using other fluophosphoric acids. By employing this technique advantage is taken not only of the heat of reaction which is obtained in the reaction of silica and water but also the heat that results from the admixing of anhydrous fluophosphoric acid and water. This latter effect is shown in Table II.

TABLE II

*Temperature rise on mixing difluophosphoric acid with water*

| Percent DiFP Acid | Percent Water | Initial Temp. of Acid | Initial Temp. of Water | Temp. Rise on Mixing Acid and Water |
|---|---|---|---|---|
| 16.7 | 83.3 | 77 | 77 | 30 |
| 25 | 75 | 79 | 79 | 56 |
| 33.3 | 66.7 | 78 | 78 | 75 |
| 50 | 50 | 79 | 79 | 98 |
| 60 | 40 | 79 | 79 | 94 |
| 70 | 30 | 81 | 81 | 89 |

These data were obtained by admixing various proportions of difluophosphoric acid and water, and noting the maximum temperature that was attained. It is thus seen from the above information that the greatest overall temperature rise occurs when equal amounts by weight of acid and water are admixed. Fortunately, it is at this concentration that the fluophosphoric acid treating solution is the most reactive towards silica. Therefore for the best results it is preferred that sufficient water be employed in making the silica-containing slurry to provide for the admixing of equal weight proportions of the anhydrous fluophosphoric acid and the water. Also in making up the aqueous siliceous slurry it is advisable not to use a colloidal suspension of finely divided sand dispersed in the water to produce the desired result because the colloidal sand might have a tendency to infiltrate into the formation interstices and have a plugging effect.

In carrying out the instant invention it is preferred that the acidizing be carried out at the highest practical temperature which can be obtained. If possible, the area at which the acidizing medium is to be introduced should be heated by injection of hot water prior to acidizing to supplement the results obtained from the instant invention. Any of the fluophosphoric acids may be employed as the acidizing reagent. These include anhydrous monofluophosphoric acid which is principally $H_2PO_3F$ with varying amounts of $HPO_2F_2$ and $H_3PO_4$ as impurities, anhydrous difluophosphoric or a concentrated aqueous solution of hexafluophosphoric acid. However it is preferred that the difluophosphoric acid be used because of the greater reactivity evinced by this composition. The quantity of acid to be used will depend upon the nature and thickness of the formation to be treated. The limits of acid treat should be from about 10 to 200 barrels of acid depending upon the thickness of the producing formation treated. However if the occasion demands the quantity of acid used may be as high as 400 barrels or more. Furthermore, an inhibitor may be added to the acid treating solution to mitigate or prevent the corrosive effects of the acid solution on the metallic equipment exposed to the acid solution. Small amounts of arsenous oxide have been found to be effective in providing a corrosion inhibiting effect. For example, the addition of about 1 to 2 per cent by weight of arsenous oxide inhibits the corrosive action of the acid solution on ferrous metals to the extent that only negligent corrosion is observed at ordinary temperatures encountered in a borehole. It is also preferred that surface active agents be added to the acid to facilitate its penetration into the formation.

In the injection of the acid treating reagent into the formation conventional equipment may be employed. In obtaining the maximum benefits from the use of fluophosphoric acid, it is preferred that aqueous solutions of the acid be utilized. This treating solution may be prepared by intermixing the acid and the water prior to the injection of the treating solution into the well. When this method is employed the acidizing procedures described in United States Patents 1,891,667 or 2,018,199 to Carr may be employed. However it is preferred that the acid treating solution be prepared by mixing the acid and the water at the face of the formation which is to be treated. In utilizing this procedure a relatively small bore tubing or "macaroni string" is used to inject the anhydrous acid. The string extends from the surface of the well to the bottom of the interval in which it is desired to apply the acid. The tubing head connections are arranged so that the anhydrous acid may be pumped into the "macaroni string" and simultaneously therewith water be introduced into the annular spacing between the "macaroni string" and the wall of the well. When this procedure is employed the mixing of the water and the anhydrous acid will take place at the face of the formation. Although varying concentrations may be used, it is preferred that a 50 per cent by weight solution be employed. Where highly permeable formations are encountered it is practical to use the jet method of acidizing wherein the treating solution is pumped at high pressures against the face of the producing formation.

It is therefore seen that by means of the instant invention increased benefits are obtained from the use of fluophosphoric acids than have heretofore been provided.

What is claimed is:

1. In the acid treatment of a siliceous geological formation traversed by a borehole where, in said treatment, an aqueous solution of a fluophosphoric acid is employed as the acidizing medium to improve the fluid conductivity of said formation, the steps which comprise contacting sufficient amounts of the acidizing medium with loose, granular siliceous material deposited in the borehole adjacent to the formation to be treated for a time sufficient to react with not less than about 10% by weight of the acidizing medium and cause a substantial rise in temperature of the acidizing medium, thereby producing a heated, partially spent acidizing medium, containing sufficient quantities of unreacted acidizing medium to effect said acid treatment, and thereafter forcing the heated, partially spent acidizing medium into the formation to be treated, whereby the unreacted portion of said acidizing medium reacts with the siliceous constituents of said formation to improve its fluid conductivity.

2. In the acid treatment of a siliceous geological formation traversed by a borehole where, in said treatment, an aqueous solution of a fluophosphoric acid is employed as the acidizing medium to improve the fluid conductivity of said formation, the steps which comprise introducing a loose, granular siliceous material from an extrinsic source into the borehole adjacent to the formation to be treated, contacting the granular siliceous material with sufficient amounts of a fluophosphoric acid-containing solution for a time sufficient to react not less than about 10% by weight of the acidizing medium and cause a substantial rise in temperature of the acidizing medium thereby producing a heated, partially spent acidizing medium, containing sufficient quantities of unreacted acidizing medium to effect said acid treatment, and thereafter forcing the heated, partially spent acidizing medium into the formation to be treated, whereby the unreacted portion of said acidizing medium reacts with the siliceous constituents of said formation to improve its fluid conductivity.

3. In the acid treatment of a siliceous geological formation traversed by a borehole where, in said treatment, an aqueous solution of a fluophosphoric acid is employed as the acidizing medium to improve the fluid conductivity of said formation, the steps which comprise reaming a wall section of the bore hole adjacent the face of the formation to produce a quantity of loose, siliceous particles in the borehole adjacent to the formation, contacting the siliceous cuttings thus produced with sufficient amounts of a fluophosphoric acid-containing solution in the borehole for a time sufficient to react with not less than about 10% by weight of the acidizing medium and cause a substantial rise in temperature of the acidizing medium, thereby producing a heated, partially spent acidizing medium containing sufficient quantities of unreacted acidizing medium to effect said acid treatment, and thereafter forcing the partially spent acidizing medium into the formation to be treated, whereby the unreacted portion of said acidizing medium reacts with the siliceous constituents of said formation to improve its fluid conductivity.

4. In the acid treatment of a siliceous geological formation traversed by a borehole where, in said treatment, an aqueous solution of a fluophosphoric acid is employed as the acidizing medium to improve the fluid conductivity of said formation, the steps which comprise introducing an explosive into the borehole adjacent the formation to be treated, the amount of explosive being substantially less than that required to produce the disruptive force normally employed in using explosives in well completions, thereby producing a quantity of loose shatterings from the face of the formation to be treated, contacting the siliceous shatterings with sufficient amounts of a fluophosphoric acid-containing solution for a time sufficient to react with not less than about 10% by weight of the acidizing medium and cause a substantial rise in temperature of the acidizing medium, thereby producing a heated, partially spent acidizing medium containing sufficient quantities of unreacted acidizing medium to effect said acid treatment, and thereafter introducing the heated, partially spent acidizing medium into the formation to be treated, whereby the unreacted portion of said acidizing medium reacts with the siliceous constituents of said formation to improve its fluid conductivity.

5. In the acid treatment of a siliceous geological formation traversed by a borehole where, in said treatment, an aqueous solution of a fluophosphoric acid is employed as the acidizing medium to improve the fluid conductivity of said formation, the steps which comprise separately introducing an aqueous slurry of finely divided siliceous material and a quantity of anhydrous fluophosphoric acid into the borehole, intermixing sufficient amounts of said slurry and said acid within the borehole adjacent the formation to be treated for a time sufficient to react with not less than about 10% by weight of the acidizing medium and cause a substantial rise in the temperatures of the acidizing medium to produce a heated, partially spent aqueous solution of fluophosphoric acid containing sufficient amounts of unreacted fluophosphoric acid to effect said treatment, and thereafter forcing the heated, partially spent solution into the formation to be treated, whereby the unreacted portion of said acidizing medium reacts with the siliceous constituents of said formation to improve its fluid conductivity.

6. A method in accordance with claim 5 in which the acid and the aqueous vehicle of the slurry are introduced into the borehole in substantially equal proportions.

7. A method in accordance with claim 2 in which said contacting is carried out with sufficient amounts of said acidizing medium and for a sufficient time to react about 10–30% by weight of the acidizing medium whereby a temperature of about 125°–200° F. is produced in said partially spent acidizing medium.

References Cited in the file of this patent

UNITED STATES PATENTS

| 1,891,667 | Carr | Dec. 20, 1932 |
| 2,080,875 | Pitzer | May 18, 1937 |
| 2,218,306 | Austerman | Oct. 15, 1940 |
| 2,366,373 | Voorhees | Jan. 2, 1945 |
| 2,386,605 | Harton et al. | Oct. 9, 1945 |
| 2,664,165 | Bond | Dec. 29, 1953 |
| 2,664,398 | Bond | Dec. 29, 1953 |

OTHER REFERENCES

Acidizing Hand Book, Kingston, © 1947, page 47.